(12) United States Patent
Demougeot et al.

(10) Patent No.: US 10,436,124 B2
(45) Date of Patent: Oct. 8, 2019

(54) SIGNAL PROCESSING FOR AUTO-TUNING A GAS TURBINE ENGINE

(71) Applicants: Nicolas Demougeot, Stuart, FL (US); Felipe Lachowski, West Palm Beach, FL (US)

(72) Inventors: Nicolas Demougeot, Stuart, FL (US); Felipe Lachowski, West Palm Beach, FL (US)

(*) Notice: Subject to any disclaimer, the term of this patent is extended or adjusted under 35 U.S.C. 154(b) by 89 days.

(21) Appl. No.: 15/882,514

(22) Filed: Jan. 29, 2018

(65) Prior Publication Data

US 2018/0223742 A1 Aug. 9, 2018

Related U.S. Application Data

(60) Provisional application No. 62/455,221, filed on Feb. 6, 2017.

(51) Int. Cl.

| | |
|---|---|
| *G01M 15/14* | (2006.01) |
| *F02C 9/28* | (2006.01) |
| *F02C 3/06* | (2006.01) |
| *F02C 7/042* | (2006.01) |
| *F02C 7/057* | (2006.01) |
| *F02C 7/228* | (2006.01) |

(52) U.S. Cl.
CPC .............. *F02C 9/28* (2013.01); *F02C 3/06* (2013.01); *F02C 7/042* (2013.01); *F02C 7/057* (2013.01); *F02C 7/228* (2013.01); *F05D 2220/32* (2013.01); *F05D 2240/35* (2013.01); *F05D 2260/964* (2013.01); *F05D 2270/082* (2013.01); *F05D 2270/31* (2013.01); *F05D 2270/333* (2013.01); *G01M 15/14* (2013.01)

(58) Field of Classification Search
USPC .............................. 73/112.01, 112.03, 118.03
See application file for complete search history.

(56) References Cited

U.S. PATENT DOCUMENTS

| | | | | |
|---|---|---|---|---|
| 8,417,433 | B2* | 4/2013 | Gauthier | F02C 7/228 60/39.281 |
| 8,566,001 | B2* | 10/2013 | Stuttaford | F02C 7/1435 60/39.3 |
| 8,731,797 | B2* | 5/2014 | Demougeot | F02C 7/224 701/100 |
| 9,097,185 | B2* | 8/2015 | Demougeot | F02C 7/228 |
| 9,328,669 | B2* | 5/2016 | Rizkalla | G05B 15/02 |
| 9,376,963 | B2* | 6/2016 | Soni | F23N 5/16 |
| 9,765,702 | B2* | 9/2017 | Gauthier | G05B 15/02 |

(Continued)

*Primary Examiner* — Eric S. McCall
(74) *Attorney, Agent, or Firm* — Hovey Williams LLP (57) ABSTRACT

Methods and systems for processing a signal indicative of at least one operating condition of a gas turbine engine to remove noise associated therewith are provided. The method and systems receive a signal from one or more sensors operably coupled to a gas turbine engine, retrieves one or more known system parameters and a previously determined average signal, and processes the signal using the system parameter and the previously determined average signal to remove noise therefrom. In some of the described methods and systems, the processed signal is then compared to predetermined upper and lower limits, and, if the processed signal exceeds the limits, at least one component of the gas turbine engine, such as a fuel-flow split, is adjusted in an effort to bring the signal back within the limits.

20 Claims, 6 Drawing Sheets

(56) References Cited

U.S. PATENT DOCUMENTS

| | | | | |
|---|---|---|---|---|
| 9,803,560 B2* | 10/2017 | Stuttaford | ............... | G05B 15/02 |
| 9,915,167 B2* | 3/2018 | Soni | ...................... | F01D 21/003 |
| 9,927,818 B2* | 3/2018 | Rizkalla | .................. | F02C 7/228 |
| 2010/0300108 A1* | 12/2010 | Demougeot | ............ | F02C 7/228 |
| | | | | 60/773 |
| 2011/0265487 A1* | 11/2011 | Gauthier | ................. | F02C 7/228 |
| | | | | 60/773 |
| 2011/0270502 A1* | 11/2011 | Demougeot | ............ | F02C 7/224 |
| | | | | 701/100 |
| 2011/0270503 A1* | 11/2011 | Stuttaford | ............. | F02C 7/1435 |
| | | | | 701/100 |
| 2014/0020400 A1* | 1/2014 | Ceccherini | ................ | F02C 9/54 |
| | | | | 60/773 |
| 2014/0200721 A1* | 7/2014 | Rizkalla | .................. | F02C 7/228 |
| | | | | 700/282 |
| 2014/0277789 A1* | 9/2014 | Stuttaford | ............... | G05B 15/02 |
| | | | | 700/287 |
| 2014/0277790 A1* | 9/2014 | Gauthier | ................ | G05B 15/02 |
| | | | | 700/287 |
| 2015/0159563 A1* | 6/2015 | Soni | .......................... | F02C 9/34 |
| | | | | 60/773 |
| 2015/0184858 A1* | 7/2015 | Stuttaford | ................ | F02C 9/26 |
| | | | | 60/776 |
| 2015/0267620 A1* | 9/2015 | Rizkalla | ................. | G05B 15/02 |
| | | | | 701/100 |
| 2017/0060106 A1* | 3/2017 | Bellido-Gonzalez | ........................ | |
| | | | | G05B 11/42 |
| 2017/0145851 A1* | 5/2017 | Soni | ...................... | F01D 21/003 |

\* cited by examiner

SIGNAL PROCESSING FOR AUTO-TUNING A GAS TURBINE ENGINE

CROSS REFERENCE TO RELATED APPLICATION

This non-provisional application claims the benefit of priority of U.S. Provisional Application No. 62/455,221, filed Feb. 6, 2017, and titled "Signal Processing for Auto-Tuning a Gas Turbine Engine," which is incorporated by reference herein in its entirety.

TECHNICAL FIELD

The field of the invention relates to gas turbines and their associated control systems and sensors.

BACKGROUND OF THE INVENTION

Gas turbine engines operate to produce mechanical work or thrust. Specifically, land-based gas turbine engines typically have a generator coupled thereto for the purposes of generating electricity. The shaft of the gas turbine engine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

Increasingly, a control system is used to regulate the operation of the gas turbine engine. In operation, the control system receives a plurality of signals that communicate the current operating conditions of the gas turbine engine such as, for example, pressures, temperatures, fuel-flow rates, and engine frequencies, among others. In response, the control system makes adjustments to the inputs of the gas turbine engine—that is, auto-tunes the gas turbine engine—to maintain the desired performance.

Often, however, these signals may be relatively noisy. For example, in some applications noise levels may be upwards of 50% of the average underlying trace signal, limiting the value of such signals for effectively auto-tuning a gas turbine engine. This leads to a control system making less-than-ideal adjustments or even adjustments that decrease the performance of the gas turbine engine. It would thus be beneficial to reduce the noise associated with these signals, resulting in improved auto-tuning of a gas turbine engine.

SUMMARY

This summary presents a high-level overview of various aspects of the invention and a selection of concepts that are further described below in the detailed description section of this disclosure. This summary is not intended to identify key or essential features of the claimed subject matter, nor is it intended to be used as an aid in isolation to determine the scope of the claimed subject matter. The scope of the invention is defined by the claims.

Generally, embodiments of the present invention relate to processing a signal used during auto-tuning a gas turbine engine to remove the noise associated therewith and, in turn, reduce the number of less-than-ideal or even wrong decisions the auto-tune system may otherwise make. In some embodiments, the amount of noise present in a signal is reduced from upwards of 50% down to 1% or below. Some embodiments may process the signal using only a current signal reading, a previously calculated average signal, and known system parameters. As such, there is no need to log the processed signal over time, making embodiments of the invention ideal for applications with processing and/or memory constraints.

More particularly, some embodiments relate to a method for processing signals associated with a gas turbine engine to remove noise associated therewith. The method may include receiving a signal from one or more sensors operably coupled to the gas turbine engine, the signal being indicative of at least one operating condition of a gas turbine engine such as, e.g., combustion dynamics or emission composition, and retrieving a previously determined average signal and known system parameters, such as a time constant of the system. Using the received signal, the previously determined average signal, and the time constant, the method calculates an average (or processed) signal, which may be more indicative of the at least one operating condition of the gas turbine engine than the unprocessed (or live) signal because the associated noise has been removed therefrom.

Other embodiments relate to a method of auto-tuning a gas turbine engine using such a processed signal. In such embodiments, the method may compare the processed signal to predetermined upper and lower limits, and, if the signal exceeds the limits, the method may adjust at least one component of the gas turbine engine. For example, the method may adjust one or more fuel-flow splits of the gas turbine engine in an effort to bring the monitored operating condition back within the limits.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the various embodiments of the present invention is described with specificity in this disclosure to meet statutory requirements. However, the description itself is not intended to limit the scope of invention. Rather, the claimed subject matter may be embodied in various other ways to include different features, components, elements, combinations, and/or steps similar to the ones described in this document, and in conjunction with other present and future technologies. Terms should not be interpreted as implying any particular order among or between various steps unless the stated order of steps is required. Many different arrangements of the various components depicted, as well as use of components not shown, are possible without departing from the scope of the claims.

At a high level, the present invention generally relates to systems and methods for processing signals used in a control system of a gas turbine system. More specifically, embodiments of the invention relate to processing signals originating from one or more sensors monitoring operating conditions of the gas turbine in order to reduce or remove the noise associated therewith. Embodiments determine a current processed signal, or average trace signal, using a current trace value and a previously calculated average trace value. In this regard, the trace signal may be processed with relatively low amounts of memory, because there is no requirement to log the processed signal over time. Thus, the system and methods described herein may be ideally employed in applications with processing restraints.

Figure 1:
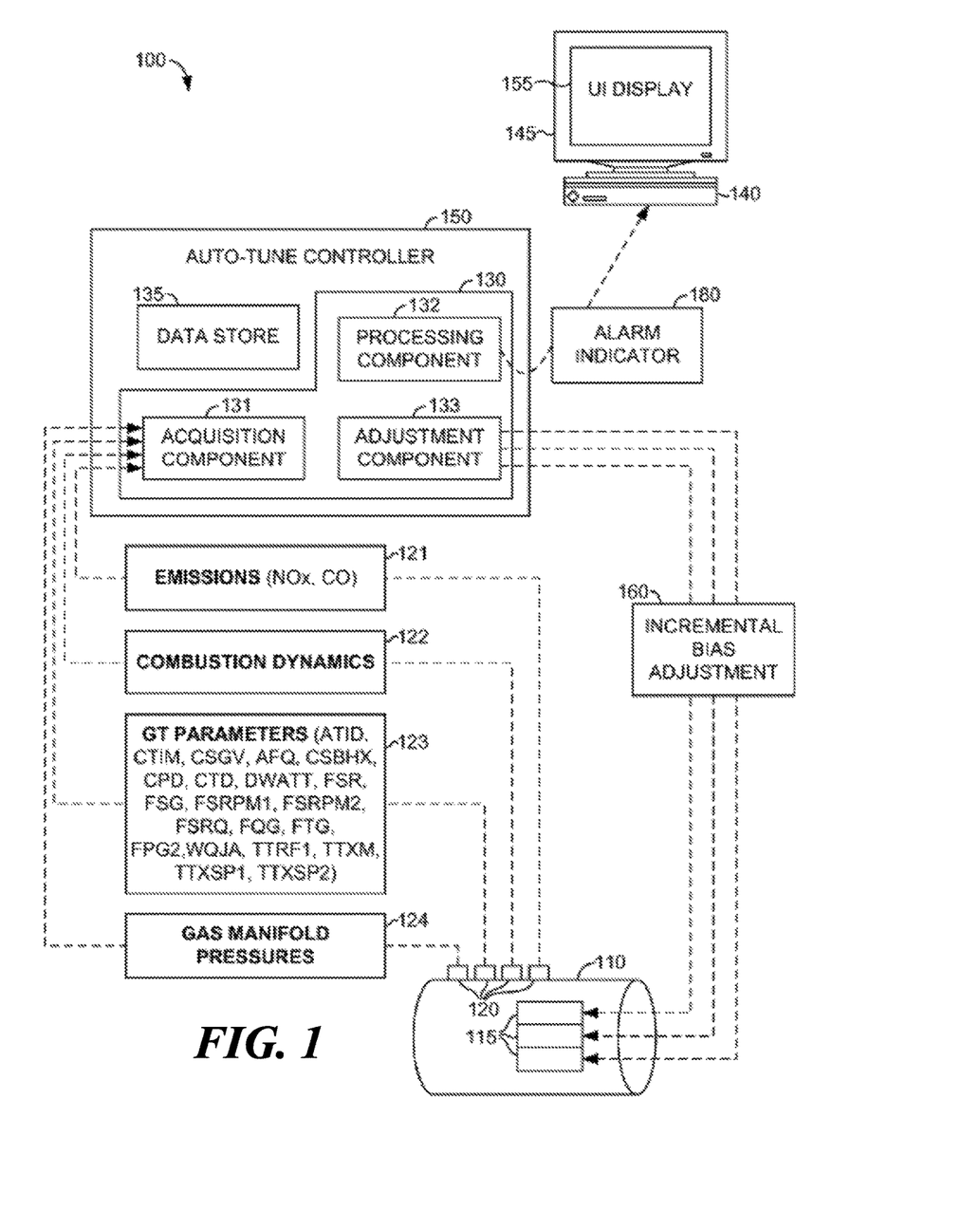
FIG. 1 is a block diagram of a tuning environment suitable for use in embodiments of the present invention.

Turning now to FIG. 1, a gas turbine (GT) engine 110 is depicted that accommodates a plurality of combustors 115. Generally, for the purpose of discussion, the GT engine 110 may include any low emission combustors. In one instance, these low emission combustors may be arranged in a can-annular configuration about the GT engine 110. One type of GT engine (e.g., heavy duty GT engines) may be typically provided with, but not limited to, 6 to 18 individual combustors, each of them fitted with a combustor liner, end cover, and casings. Another type of GT engine (e.g., light duty GT engines) may be provided with fewer combustors. Accordingly, based on the type of GT engine, there may be several different fuel circuits utilized for operating the GT engine 110. Further, there may be individual fuel circuits that correspond with each of the plurality of combustors 115 attached to the GT engine 110. As such, it should be appreciated and understood that an auto-tune controller 150, and the tuning process executed thereby, can be applied to any number of configurations of GT engines and that the type of GT engines described herein below should not be construed as limiting on the scope of the present invention.

The plurality of combustors 115 (e.g., low emission combustors) may be prone to elevated levels of pressure fluctuation within the combustor liner. These pressure fluctuations are referred to as "combustion dynamics" 122. Left alone, combustion dynamics 122 can have a dramatic impact on the integrity and life of the plurality of combustors 115, eventually leading to catastrophic failure.

Further, when outside an optimal operating range, the GT engine 110 may emit emissions with properties that are unacceptable (i.e., exceed a predefined threshold). In embodiments, these properties of the GT engine 110 emissions may include "emission composition" 121, which is measure periodically by a monitoring device (e.g., continuous emission monitoring system (CEMS)). By way of example, the emission composition 121 may be measured in units of parts per million (ppm) for each of NOx and CO, while $O_2$ may be measured in percent (%) composition. As such, emission composition 121 relates to the amount of pollutant that is generated by the GT engine 110. Once the emission composition 121 is measured, it is compared against a critical (maximum/minimum) value to determine whether the emission composition 121 is actually unacceptable.

These effects of elevated combustion dynamics 121 and/or unacceptable emission compositions 121 may be mitigated or cured by adjusting fuel-flow splits of the combustor gas flow between several groups of nozzles within the plurality of combustors 115. Generally, a fuel-flow split is commonly adjusted for each of the plurality of combustors 115; thus, the combustors (burners) are tuned alike, as opposed to tuning at the individual burner level. These different "fuel-flow splits" are occasionally tuned to ensure that acceptable levels (conventionally low levels) of the combustion dynamics 122 are maintained while, at the same time, promoting acceptable emission compositions 121.

For example, FIG. 1 further illustrates an exemplary tuning environment 100 suitable for use in embodiments of the present invention. The exemplary tuning environment 100 includes the auto-tune controller 150, a computing device 140 operably coupled to a presentation device 145 for displaying a user interface (UI) display 155, and the GT engine 110. The auto-tune controller 150 includes a data store 135 and a processing unit 130 that supports the execution of the acquisition component 131, the processing component 132, and the adjustment component 133. Generally, the processing unit 130 is embodied as some form of a computing unit (e.g., central processing unit, microprocessor, etc.) to support operations of the component(s) 131, 132, and 133 running thereon. As utilized herein, the phrase "processing unit" generally refers to a dedicated computing device with processing power and storage memory, which supports operating software that underlies the execution of software, applications, and computer programs thereon. In one instance, the processing unit 130 is configured with tangible hardware elements, or machines, that are integral, or operably coupled, to a computer. In another instance, the processing unit may encompass a processor (not shown) coupled to the computer-readable medium (discussed above). Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

In addition, the auto-tune controller 150 is provided with the data store 135. Generally, the data store 135 is configured to store information associated with the tuning process or data generated upon monitoring the GT engine 110. In various embodiments, such information may include, without limitation, measurement data (e.g., measurements 121, 122, 123, and 124) provided by sensors 120 coupled to the GT engine 110. In addition, the data store 135 may be configured to be searchable for suitable access of stored information. For instance, the data store 135 may be searchable for dynamic schedules in order to determine which fuel-flow split to increment upon comparing the measured combustion dynamics 122 to corresponding predetermined limit(s) and upon comparing the measured emissions compositions 121 to corresponding critical values, respectively. It will be understood and appreciated that the information stored in the data store 135 may be configurable and may include any information relevant to the tuning process. The content and volume of such information are not intended to limit the scope of embodiments of the present invention.

A control system operating in the tuning environment 100 is used to assess the state of the GT engine 110 and the plurality of combustors 115 in terms of parameters such as the combustion dynamics 122, emission compositions 121, GT parameters 123, and gas manifold pressures 124. Based on those parameters, the adequate fuel-flow splits are selected and are adjusted incrementally until an alarm has been cleared. Typically, the alarm, represented schematically by alarm indicator 180, is set upon detecting that an amplitude of a pressure pulse surpasses a predetermined upper or lower limit and/or upon recognizing that the composition of the combustor emissions has exceeded a particular critical value. Accordingly, embodiments of the present invention concern the auto-tune controller 150, as well as the associated tuning process, that enables automatic tuning of the combustion dynamics 122 and emission compositions 121 using small, consistent incremental changes of a dynamically selected fuel-flow split.

An overall tuning process carried out by the auto-tune controller 150 may comprise one or more of the steps described immediately below. Initially, in one embodiment, various configurations of combustion dynamics 122 and/or emissions compositions 121 of the plurality of combustors 115 are monitored and recorded. These recorded signals may be passed through a Fourier Transform or another transformative operation, where the pressure signals are converted into an amplitude versus frequency data format or spectrum. For the pressure signals, the amplitude, values, and frequencies may be compared against a predetermined upper or lower limit for, e.g., a predefined frequency band, while the emission-composition parameters may be compared against predefined critical values. The predetermined limit is generally defined in terms of pounds per square inch (psi) for a predefined frequency bands, while the critical values are defined in terms of parts per million (ppm) or percentage. However, in other instances, the predetermined limits and critical values may be expressed in other terms or units, where other types are devices are used to measure performance of the combustors 115 (e.g., accelerometers).

If the determination is made that, e.g., one or more of the frequency-based amplitude exceeds its respective predetermined limit(s) for a predetermined frequency band, or one or more gases comprising the emission composition surpasses its respective critical values, then the auto-tune controller 150 adjusts one or more operating parameters, such as, e.g., a fuel flow split, an exhaust temperature bias, a purge level, an inlet guide vane opening, an inlet bleed heat position, or other component. For example, the auto-tune controller may dynamically select a fuel-flow split to adjust and then adjust the selected fuel-flow split a single time at a predefined amount. Namely, adjusting the fuel-flow split may be accomplished by the adjustment component 133 transmitting an incremental bias adjustment 160 to at least one of the plurality of combustors 115 mounted to the GT engine 110. In one embodiment, automatic valves on the combustors 115 adjust the fuel-flow split for a subject fuel circuit in response to recognizing the incoming incremental bias adjustment 160.

Once the single, fuel-flow split adjustment is made, the process reiterates. That is, the steps of (a) monitoring and comparing the amplitude for a number of predetermined frequency bands to the predetermined limits, (b) selecting a fuel-flow split using the schedules, and (c) making an incremental adjustment to the selected fuel-flow split are repeated if the monitored signal(s) surpasses the predetermined limit(s). As such, in instances, when the monitored signal(s) is ascertained to surpass the predetermined limit(s), a predetermined adjustment may be made to the previously selected fuel-flow split or a different fuel-flow split. In other embodiments, depending upon specific operating conditions, site requirements, or turbine parameters adjustments may be made to an exhaust temperature bias, purge level, inlet guide vane opening, inlet bleed heat position, or other adjustment component, as determined by turbine frame or site specific operational necessities. Adjustment for each of these components follows the steps of (a) monitoring and comparing the amplitude for a number of predetermined frequency bands to the predetermined limits, (b) selecting a component parameter using the schedules, and (c) making an incremental adjustment to the selected component parameter which are repeated if the monitored signal(s) surpasses the predetermined limit(s). Once a single adjustment is made, the process reiterates until predetermined limits are maintained.

The above-described method is a simplified version of an auto-tuning method for a GT engine 110. Various systems and methods for auto-tuning a GT engine are described in more detail in co-owned U.S. Pat. Nos. 9,376,963, 9,328, 669, 9,097,185, 8,731,797, 8,566,001, 8,417,433, and U.S. patent application Ser. Nos. 14/947,785, 14/213,366, 14/213,337, and 14/213,122, which are herein incorporated by reference in their entirety.

Some embodiments of the instant invention relate to processing a signal used in an auto-tune process of a GT engine, such as the auto-tune processes described above. For example, in some instances a signal originating from one or more of the sensors 120 may be relatively noisy with noise levels being upwards of 50% of the underlying average trace signal. Accordingly, a control system that in turn auto-tunes the GT engine 110 via, e.g., the processes described above, may engage in less-than-ideal, or worse yet, incorrect, adjustments in light of the noise present in the received signal. By way of example, an auto-tune control system using, e.g., a noisy emissions 121 and/or combustion dynamics 122 signal may make a wrong adjustment upwards of 40% of the time due to the noise present.

Some embodiments of the invention address this deficiency by processing a received signal (e.g., the emission composition 121 or combustion dynamics 122 signal) in order to extract an average trace signal from the noisy trace signal. By doing so, the number of less-than-ideal or wrong decisions made by the control system can be reduced from upwards of 40% to 1% or even less.

Figure 2:
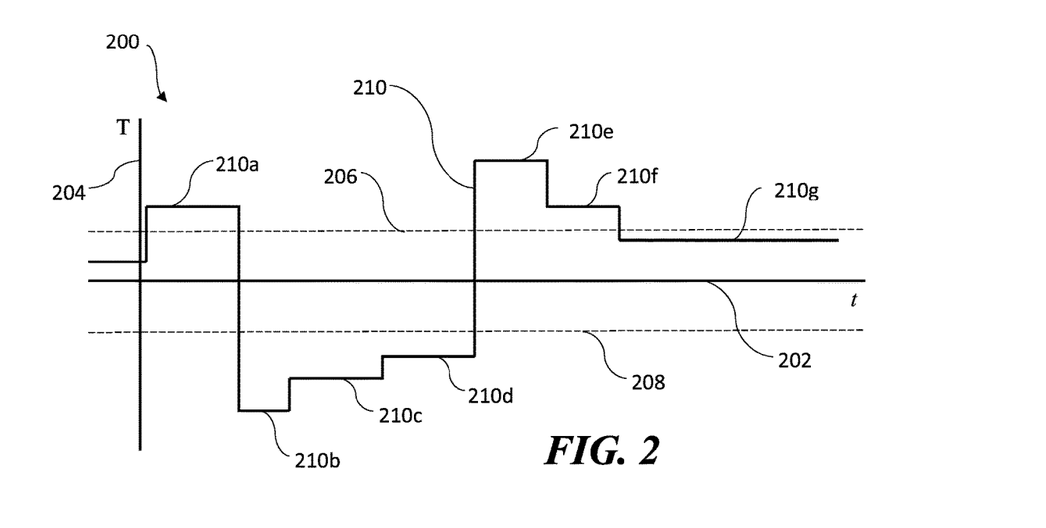
FIG. 2 is a graph including a trace signal originating from one or more sensors provided in the tuning environment shown in FIG. 1.

This may be more readily understood with reference to FIGS. 2-7. FIG. 2 is a graph 200 showing a curve of a trace signal 210 as a function of the amplitude, T, of the signal (plotted along the y-axis 204) versus time, t (plotted along the x-axis 202). As should be appreciated given the benefit of this disclosure, the amplitude T may be in any useful unit measured by sensors 120. So, for example, for a sensor 120 configured to measure combustion dynamics 122, the unit of the amplitude T of the trace signal 210 may be a unit of pressure; e.g., pounds per square inch (psi). In embodiments utilizing a sensor 120 configured to measure emission compositions 121, the unit of the amplitude T of the trace signal 210 may be a concentration of a given emissions component; e.g., the ppm of either NOx or CO, or the percent composition of $O_2$.

The graph 200 further includes an upper limit 206 and a lower limit 208. The upper and lower limits 206 and 208 schematically represent predetermined limit(s) and/or critical values of the combustion dynamics 122 and emission compositions 121, as discussed above. Namely, the upper and lower limits 206 and 208 schematically represent limits that, if the trace signal 210 exceeds, the control system will auto-tune the GT engine in an effort to bring the corresponding parameter back within the desired limits. For example, in FIG. 2, portions 210a, 210e, and 210f of the trace signal 210 exceed the upper limit 206, while portions 210b, 210c, and 210d, exceed the lower limit 208. In the depicted embodiment, only portion 210g of the trace signal 210 is within the upper and lower limits 206, 208. Accordingly, a control system tasked with auto-tuning the GT engine 110 may make adjustments at a point in time corresponding to each of portions 210a-f.

But because, as discussed, this trace signal 210 includes high levels of noise, many of these adjustments may be unnecessary. That is, the actual signal at one or more of portions 210a-f may actually be within limits 206, 208, although it is unknown to the control system due to noise present.

Figure 3:
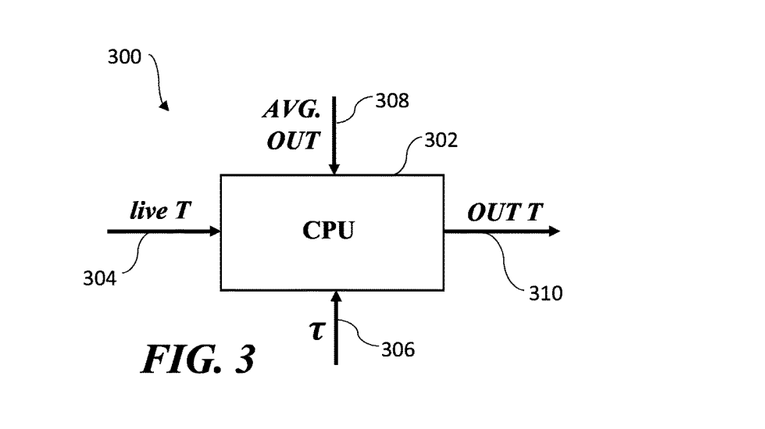
FIG. 3 is a schematic of a signal processor used to process the trace signal shown in FIG. 2.

Accordingly, embodiments of the invention process the trace signal 210 to reduce the noise level from, e.g., upwards of 50% down to 1% or even lower. As schematically represented in FIG. 3, this processing is carried out using a signal processor 300. The signal processor 300 includes a processing unit 302 (such as, e.g., the processing unit 130 discussed above), which receives a live trace signal 304 (such as, e.g., trace signal 210 discussed above), at least one known system parameter such as, e.g., a time constant of the GT engine 306 (represented by τ in FIG. 3 and in the following formulas), and a previously determined average trace signal 308, and which in turn outputs a processed signal 310.

The time constant 306 is a system-specific parameter which characterizes the system's response to a step input. For example, the GT engine 110 system may be approximated or modeled as a first-order, linear time-invariant (LTI) system, and the trace signal 210, in turn, may be approximated as a series of step inputs to the first-order, LTI system. Under such assumptions, and as will be appreciated by those having skill in the art, one time constant 306 will equal to the time it takes for the system's step response to reach 1'1/e (or approximately 63.2%) of its final asymptotic value. Similarly, two, three, four, and five time constants 306 will equal to the time it takes for the system's step response to reach approximately 86.5%, 95.0%, 98.2%, and 99.3%, respectively, of its final asymptotic value.

In that regard, the time it takes for the system's step response to reach approximately 90%, 99%, and 99.99% of its final asymptotic value, can be determined using the following formulas:

$$\text{for 90\%: } 0.1 = e^{-\frac{t}{\tau}} \rightarrow t = (-\ln(0.1))\tau \cong 2.3\tau \quad (1)$$

$$\text{for 99\%: } 0.01 = e^{-\frac{t}{\tau}} \rightarrow t = (-\ln(0.01))\tau \cong 4.6\tau \quad (2)$$

$$\text{for 99.99\%: } 0.0001 = e^{-\frac{t}{\tau}} \rightarrow t = (-\ln(0.0001))\tau \cong 9.2\tau \quad (3)$$

The time constant 306 varies depending on the specific components, etc., of the GT engine 110, and thus may be determined experimentally, via computer-aided modeling of the system, or otherwise.

Using the live trace signal 304, the known system parameters such as the predetermined time constant 306, and the previously determined average trace signal 308, the processing unit 302 outputs a processed signal 310 that, in turn, can be used by the control system when auto-tuning the GT engine 110, if necessary. That is, the processed signal 310 is an average trace signal with the noise "removed" therefrom, and thus more accurately represents whether the monitored operating condition of the GT engine 110 (e.g., the combustion dynamics 122 and/or emission composition 121) has exceeded a predetermined threshold value. Because, as will be discussed in more detail below, the processed signal 310 is determined using the current live trace signal 304 and the stored average trace signal 308, there is no requirement that the processing unit 302 log and store data regarding the live trace signal 304 over time. Instead, the processing unit 302 determines the processed signal 310 solely from (in addition to the known system parameters) an instantaneous value of the live trace signal 304 and a value of the previously determined average trace signal 308, reducing memory requirements, and thus making the process described herein ideal for auto-tune applications having processing constraints.

By way of example, at any given time, t+Δt, the processing unit may determine an average trace signal, OUT(t+Δt), using the predetermined time constant, τ, the value of a current live signal, T, and the previously determined average trace signal, OUT(t), according to the following formula:

$$OUT(t + \Delta t) = T - (T - OUT(t))e^{-\frac{\Delta t}{\tau}} \quad (4)$$

In other embodiments, other formulas may be utilized to determine the average trace signal, OUT(t+Δt), including, e.g., a polynomial based function such as a Taylor series.

Figure 4:
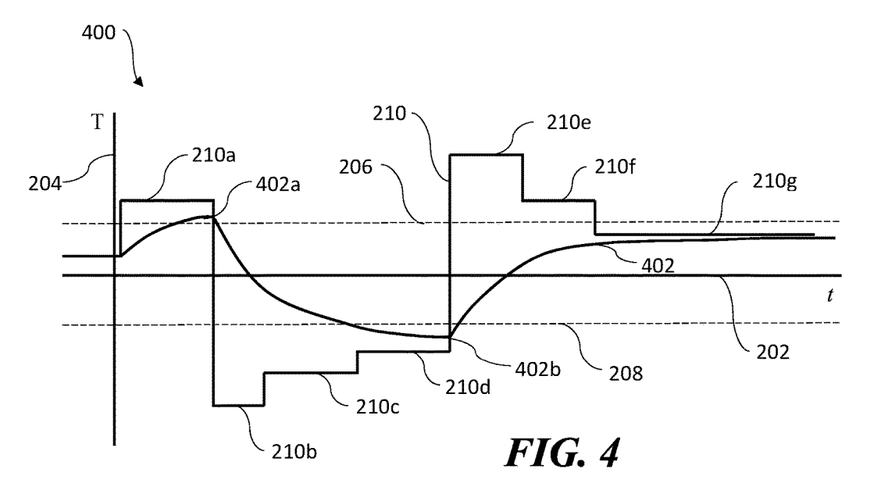
FIG. 4 is a graph including both the trace signal shown in FIG. 2, and a processed signal as one example of an output signal generated by the signal processor shown in FIG. 3.

Turning now to FIG. 4, a graph 400 shows a curve of an average, or processed, trace signal 402 superimposed on the curve of the live trace signal 210. As discussed, the live trace signal 210 may be a signal originating from one or more sensors 120. The average trace signal 402, however, is the resulting processed signal after the live trace signal 210 is processed via the processing unit 302. In one embodiment, the average trace signal 402 is a curve representing the results of the OUT(t+Δt) function discussed above. As can be seen, the average trace signal 402 is a smooth curve as compared to the live trace signal 210, because the extraneous noise has been reduced or nearly eliminated from the curve. Namely, while the live trace signal 210 may include upwards of 50% noise, the average trace signal 402 may include 1% or even less noise.

As should be apparent from the graph 400, by processing the live trace signal 210 as discussed herein, the number of bad calls by an auto-tune control system may be reduced or even eliminated. Namely, whereas the control system described in connection with FIG. 2 would have made adjustments at portions 210a-f, because each of those portions were outside the limits 206, 208, the control system now would only make adjustments twice when considering the average trace signal 402: at portions 402a and 402b (corresponding to portions 210a and 210d, respectively). Accordingly, in this example, the number of bad calls are significantly reduced. Specifically, if the control system only referenced the live signal 210, it would in turn make four unnecessary adjustments in light of the noise present in the signal; namely the unnecessary adjustments at 210b, 210c, 210e, and 210f. By processing the signal according to, e.g., the formula (4) discussed above, the processing unit 302 is thus able to significantly reduce the number of bad calls made by a control system and thus improve the performance of the auto-tune process of a GT engine 110.

Figure 5:
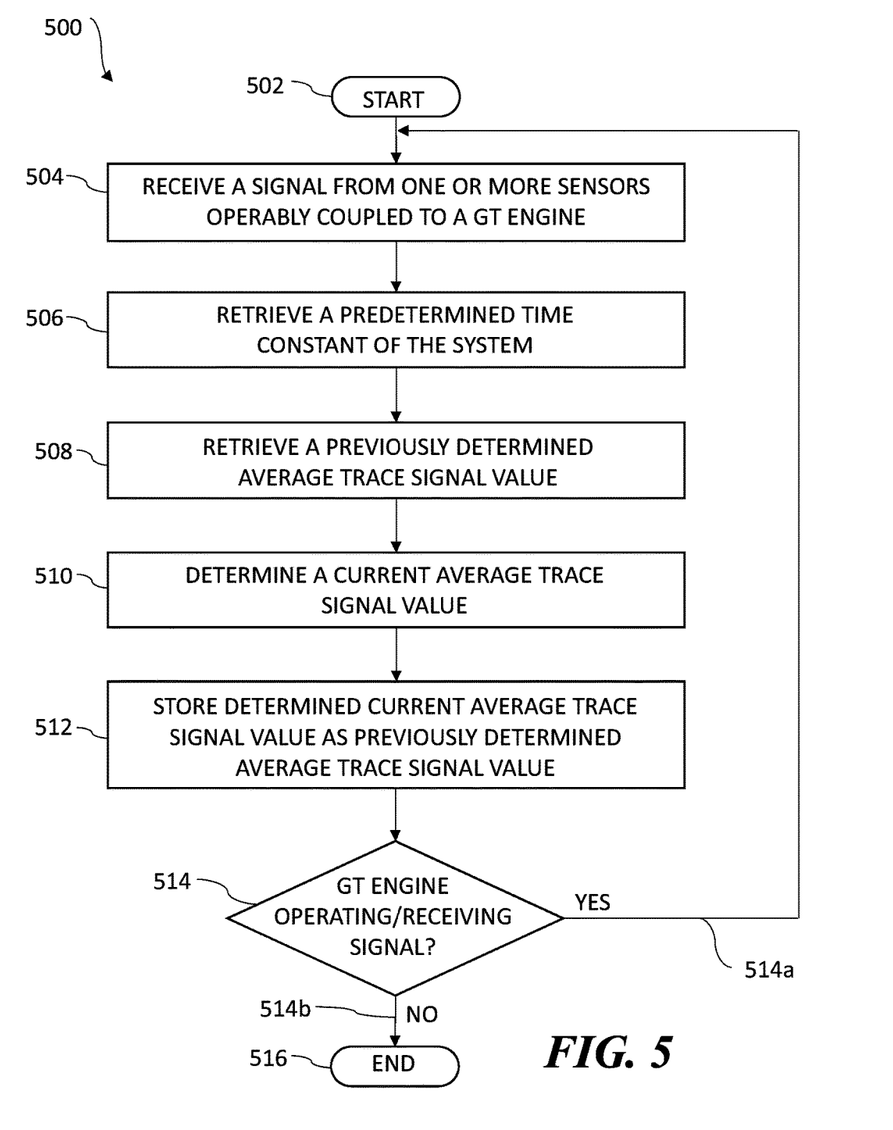
FIG. 5 is a block diagram of a method for processing signals such as the trace signal shown in FIG. 2.

Referring now to FIG. 5, a block diagram of a first exemplary method 500 of processing a control signal of a GT engine 110 is provided in accordance with an embodiment of the present invention. At step 502, the method begins, and at step 504 a processing unit (such as processing unit 130 or 302 described above) receives a trace signal from one or more sensors (such as sensor 120 described above) operably connected to the GT engine 110. A current value of the trace signal is indicative of at least one operating condition of the GT turbine engine. For example, the processing unit may receive a pressure signal from a sensor monitoring the combustion dynamics 122 of the GT engine 110, and/or may receive a concentration signal monitoring the emission composition 121 (such as NOx or CO emissions) of the GT engine 110. As will be appreciated given the benefit of this disclosure, the signal received at step 504 may be relatively noisy; that is, noise may comprise 50% or even more of the signal. That is, the trace signal may contain both an operating-condition quantifying part—which is a measure of the monitored parameter containing a minimal amount of noise—and a noise part—which, if not removed via processing, may obscure the true value of the operating-condition quantifying part.

At step 506, the processing unit retrieves at least one known system parameter, such as a predetermined time constant. As discussed, this time constant may be predetermined using, e.g., experimental methods, computer-aided modeling, or other means, and generally is a parameter characterizing the system's response to a step input.

At step 508, the processing unit retrieves a previously determined average trace signal (such previously determined average trace signal 308). For example, the method 500 iterates once every time period $\Delta t$, and the average trace signal is the processed signal determined during the previous iteration of the method 500; i.e., at a time $\Delta t$ prior to the current iteration. If the method 500 has not previously been performed—i.e., the current iteration of the method 500 is the first iteration and thus no value is stored for the previously determined average trace signal—the processing unit may instead use a zero value rather than the previously determined average trace signal value at step 508, or, in some embodiments, may use the value of the live trace signal in place of the previously determined average trace signal value. In other embodiments, the processing unit may instead use a median value chosen based on known signal ranges to improve system step response during later iterations.

At step 510, the processing unit determines a current average trace signal value (such as, e.g., processed signal 310). The value of the processed signal is generally the operating-condition quantifying part of the trace signal with the noise part removed therefrom. More particularly, the processing unit determines the current average trace signal value using the signal received at step 504, the time constant retrieved at 506, and the previously determined average trace signal value retrieved at step 508. In some embodiments, this is the only data required to determine the current average trace signal, and thus the method 500 may be ideal for applications with processing or memory constraints. That is, because the processing unit determines the processed signal at step 510 using only the current trace signal and the previously determined average trace signal (in addition to known system parameters), the processing unit need not store or otherwise log the processed signal over time, greatly reducing memory and processing requirements.

In some embodiments, the method 500 determines the current average trace signal using one or more of the formulas described above. For example, the processing unit may determine the current average trace signal using formula (4) above, reproduced below:

$$OUT(t + \Delta t) = T - (T - OUT(t))e^{-\frac{\Delta t}{\tau}}$$

Here, $OUT(t+\Delta t)$ represents the current average trace signal, T represents the live trace signal, $OUT(t)$ represents the previously determined average trace signal, e is a base of a natural logarithm (i.e., the well-known mathematical constant e, also known as Euler's number), $\tau$ is the predetermined time constant, and $\Delta t$ is an amount of time that elapsed since the processing unit determined the previously determined average trace signal value. Mathematical manipulation of this formula to achieve a similar computation is fully envisioned by the inventors, for instance using polynomial calculation of the exponential Euler's number to comply with system limitations such as programming language constraints.

At step 512, the processing unit stores the current average trace signal value as the previously determined average trace signal value. Accordingly, when the method 500 iterates once again, the processed signal determined at step 510 will be later be retrieved at step 508 and used, during that iteration of method 500, as the previously determined average trace signal value.

Finally, at step 514, the processing unit determines if the GT engine 110 is still operating and/or if the processing unit is still receiving a signal from a sensor associated therewith. If no (514*b*), the method 500 ends at step 516. If yes (514*a*), the method 500 returns to step 504, and iterates once again through each of steps 504-514, using, in that iteration, the processed signal from step 510 as the previously determined average trace signal value, as discussed.

Figure 6:
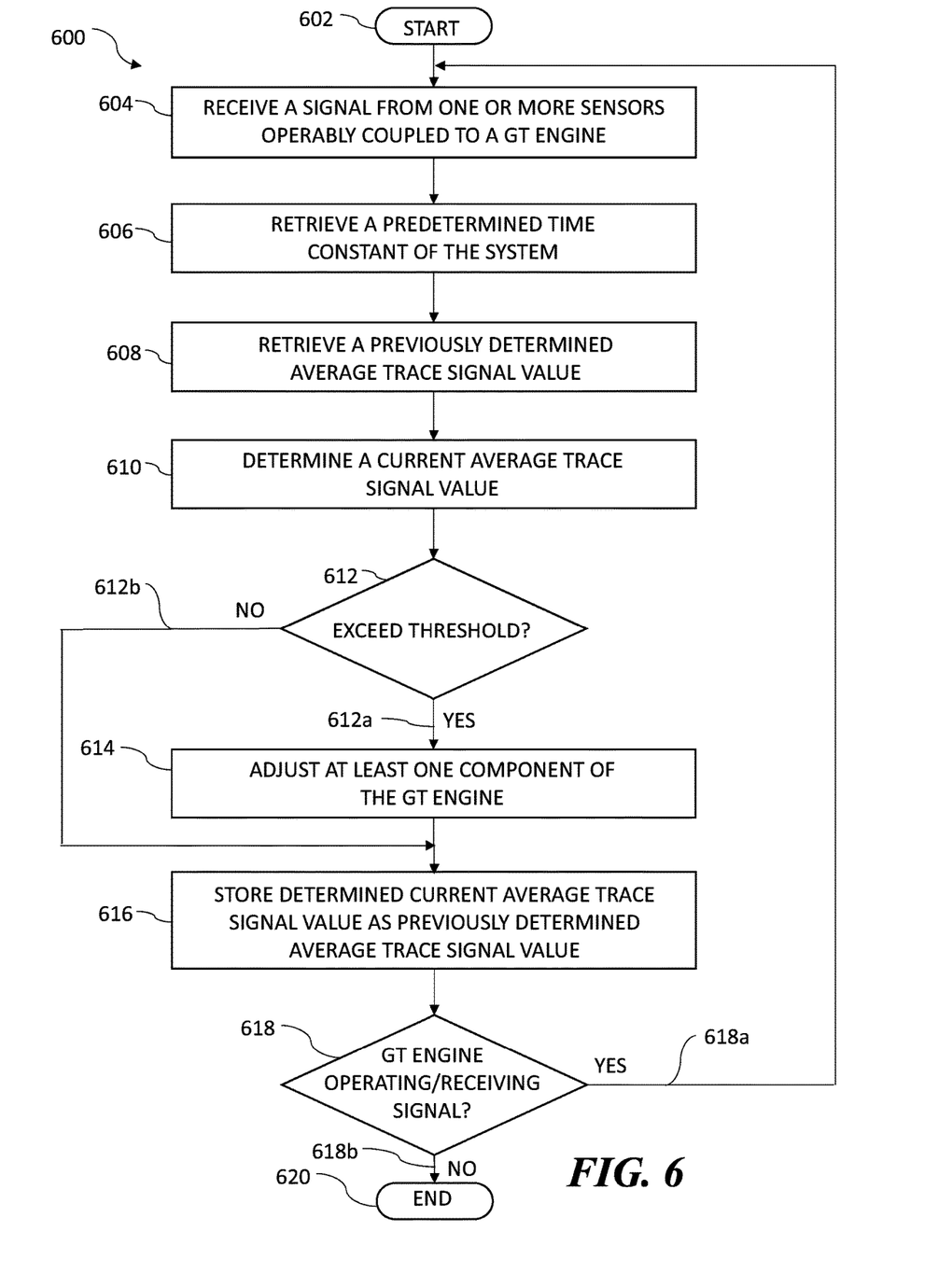
FIG. 6 is a block diagram of a method of auto-tuning a gas turbine engine using a processed signal, such as the processed signal shown in FIG. 4.

Referring now to FIG. 6, a block diagram 600 of an exemplary method of auto-tuning a GT engine 110 using a processed signal is provided, in accordance with an embodiment of the present invention. At step 602, the method 600 begins, followed by steps 604, 606, 608, and 610, which are substantially similar to steps 504, 506, 508, and 510, discussed above in connection with FIG. 5, and thus won't be discussed again in detail here.

At step 612, the processing unit detects whether the processed signal (i.e., the current average trace signal determined at step 610) exceeds predetermined threshold values. For example, the processing unit may determine whether the processed signal exceeds either the upper or lower limit 206, 208 depicted in FIG. 4. If yes (612*a*), the processing unit adjusts at least one component of the GT engine 110 at step 614 in an effort to bring the monitored operating condition back within the limits. For example, the processing unit may adjust the fuel-flow splits, exhaust temperature bias, purge level, inlet guide vane opening, inlet bleed heat position, or other adjustment component, as determined by turbine frame or site specific operational necessities, of the GT engine in an effort to reduce a pressure reading of a sensor 120 measuring combustion dynamics 122, and/or in an effort to reduce a concentration reading of a sensor 120 measuring emission compositions 121, as discussed above. Of course, if the processed signal does not exceed the predetermined threshold limits (612*b*), no auto-tuning is necessary and the method 600 skips step 614.

The method 600 then proceeds with steps 616, 618, and ultimately 620, which are substantially similar to steps 512, 514, and 516, respectively, discussed above, and thus won't be discussed again in detail here.

Figure 7:
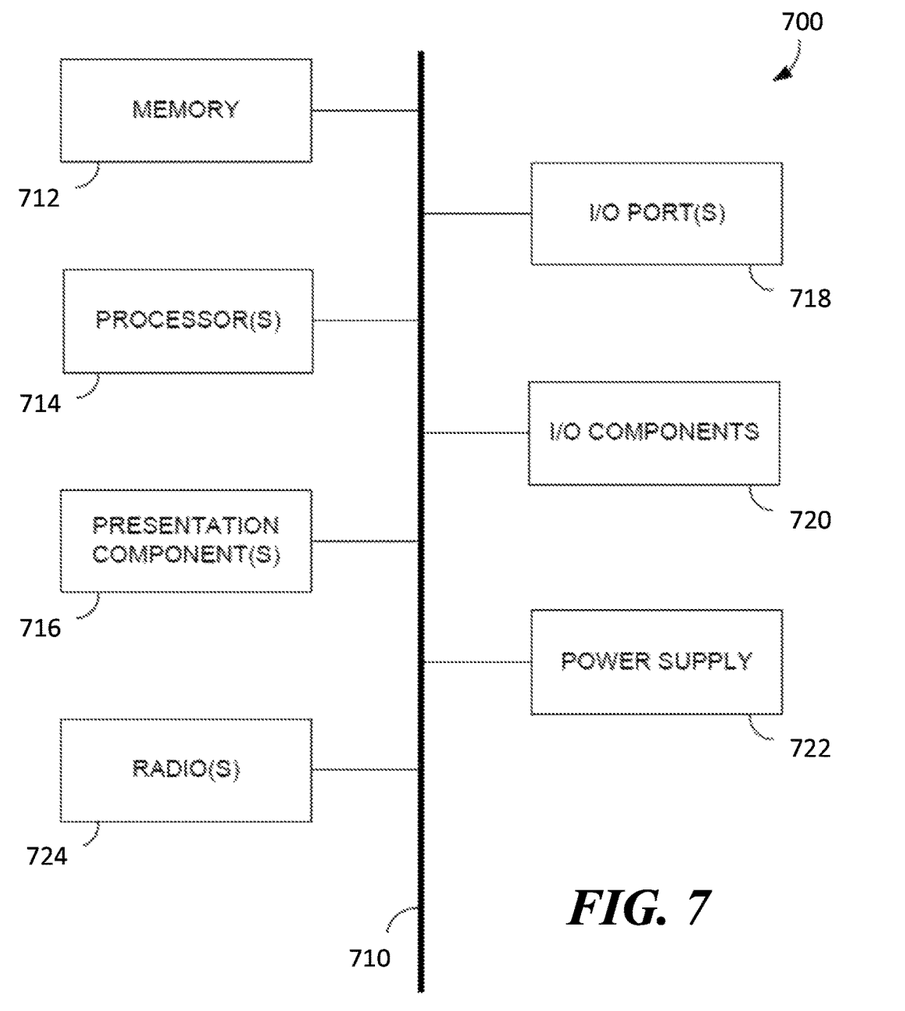
FIG. 7 is an exemplary computing environment which may be used with a control system of a gas turbine to process signals in accordance the systems and methods shown in FIGS. 1-6.

Referring now to FIG. 7, an exemplary operating environment which can be used for implementing embodiments described herein is shown and designated generally as computing device 700. Computing device 700 is but one example of a suitable computing environment and is not intended to suggest any limitation as to the scope of use or functionality of the invention. The computing device 700 should not be interpreted as having any dependency or requirement relating to any one or a combination of components illustrated.

In FIG. 7, computing device 700 includes a bus 710 that directly or indirectly couples the following devices: memory 712, one or more processors 714, one or more presentation components 716, input/output (I/O) ports 718, input/output (I/O) components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not as clear, and metaphorically, the lines are blurred. For example, one may consider a presentation component such as a display device to be an I/O component. Also, processors have memory. The diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated as within the scope of FIG. 7 and when referencing the "computing device."

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in any variety of system configurations, including hand-held devices, consumer electronics, general-purpose computers, and more specialty computing devices, among others. The invention may also be practiced in distributed computing environments where tasks are performed by remote-processing devices that are linked through a communications network.

Computing device 700 may include a variety of computer-readable media and/or computer storage media. Computer-readable media may be any available media that can be accessed by computing device 700 and includes both volatile and non-volatile media, removable and non-removable media. By way of example and not limitation, computer-readable media may comprise computer storage media and communication media and/or devices. Computer storage media may include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. These memory components can store data momentarily, temporarily, or permanently. Computer storage media does not include signals per se.

Communication media typically embodies computer-readable instructions, data structures, or program modules. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or non-volatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc. I/O ports 718 allow computing device 700 to be logically coupled to other devices including I/O components 720, some of which may be built-in. Illustrative components include a microphone, joystick, game pad, satellite dish, scanner, printer, wireless device, and the like.

Embodiments of the technology have been described herein to be illustrative rather than restrictive. Alternative embodiments will become apparent to readers of this disclosure. Further, alternative means of implementing the aforementioned elements and steps can be used without departing from the scope of the claims, as would be understood by one having ordinary skill in the art. Certain features and sub-combinations are of utility and may be employed without reference to other features and sub-combinations, and are contemplated as within the scope of the claims.

We claim:

1. A computer-implemented method, executed by one or more processors of an auto-tune controller for a gas turbine engine, for processing a signal monitoring one or more operating conditions of the gas turbine engine, the method comprising:

receiving, by an auto-tune controller, a trace signal value from one or more sensors operably coupled to a gas turbine engine, wherein the one or more sensors monitors at least one of combustor dynamics and emission composition of the gas turbine engine, and wherein the trace signal value is indicative of at least one operating condition of the gas turbine engine;

retrieving, by the auto-tune controller from memory operably associated with the auto-tune controller, one or more known system parameters, the one or more system parameters including a predetermined time constant associated with the gas turbine engine;

retrieving, by the auto-tune controller from the memory operably associated with the auto-tune controller, a previously determined average trace signal value, the previously determined average trace signal value being a trace signal value processed by the auto-tune controller at a point in time prior to retrieving the previously determined average trace signal value; and determining, by the auto-tune controller, a current average trace signal value using the trace signal value, the predetermined time constant, and the previously determined average trace signal value.

2. The method of claim 1, wherein the one or more sensors monitors the combustor dynamics of the gas turbine engine, and wherein the trace signal value is a pressure reading of a combustor of the gas turbine engine.

3. The method of claim 1, wherein the one or more sensors monitors the emission composition, and wherein the trace signal value is a concentration of at least one of nitrous oxide and carbon monoxide present in emissions from the gas turbine engine.

4. The method of claim 1, wherein determining the current average trace signal value using the trace signal value, the predetermined time constant, and the determined average trace signal value includes determining the current average trace signal value using the following formula:

$$\text{OUT}(t + \Delta T) = T - (T - \text{OUT}(t))e^{-\frac{\Delta t}{\tau}}$$

wherein OUT(t+Δt) is the current average trace signal value, T is the received trace signal value, OUT(t) is the previously determined average trace signal value, e is a base of a natural logarithm, τ is the predetermined time constant, and Δt is an amount of time that has elapsed since the one or more processors determined the previously determined average trace signal value.

5. The method of claim 1, further comprising storing, by the auto-tune controller in the memory operably associated with the auto-tune controller, the current average trace signal value as the previously determined average trace signal value.

6. The method of claim 1, further comprising adjusting at least one component of the gas turbine engine, wherein adjusting the at least one component of the gas turbine engine includes adjusting at least one fuel-flow split of the gas turbine engine.

7. The method of claim 1, further comprising adjusting at least one component of the gas turbine engine, wherein adjusting the at least one component of the gas turbine engine includes adjusting at least one of an exhaust temperature bias of the gas turbine engine, a purge level of the gas turbine engine, an inlet guide vane opening of the gas turbine engine, and an inlet bleed heat position of the gas turbine engine.

8. A computer-implemented method, executed by one or more processors of an auto-tune controller for a gas turbine engine, for dynamically tuning a combustor of a gas turbine engine, the method comprising:
receiving, by an auto-tune controller, a trace signal value from one or more sensors operably coupled to a gas turbine engine, wherein the one or more sensors monitors at least one of combustor dynamics and emission composition of the gas turbine engine, and wherein the trace signal value is indicative of at least one operating condition of the gas turbine engine;
retrieving, by the auto-tune controller from memory operably associated with the auto-tune controller, one or more known system parameters, the one or more system parameters including a predetermined time constant associated with the gas turbine engine;
retrieving, by the auto-tune controller from the memory operably associated with the auto-tune controller, a previously determined average trace signal value, the previously determined average trace signal value being a trace signal value processed by the auto-tune controller at a point in time prior to retrieving the previously determined average trace signal value;
determining, by the auto-tune controller, a current average trace signal value using the trace signal value, the predetermined time constant, and the previously determined average trace signal value;
detecting, by the auto-tune controller, that the current average trace signal value exceeds predetermined upper or lower limits; and
adjusting, by the auto-tune controller, at least one component of the gas turbine engine in response to detecting that the current average trace signal value exceeds the predetermined upper or lower limits.

9. The method of claim 8, wherein the one or more sensors monitors the combustor dynamics of the gas turbine engine, and wherein the trace signal value is a pressure reading of a combustor of the gas turbine engine.

10. The method of claim 8, wherein the one or more sensors monitors the emission composition of the gas turbine engine, and wherein the trace signal is a concentration of at least one of nitrous oxide and carbon monoxide present in emissions from the gas turbine engine.

11. The method of claim 8, wherein determining the current average trace signal value using the trace signal value, the predetermined time constant, and the determined average trace signal value includes determining the current average trace signal value using the following formula:

$$\text{OUT}(t + \Delta T) = T - (T - \text{OUT}(t))e^{-\frac{\Delta t}{\tau}}$$

wherein OUT(t+Δt) is the current average trace signal value, T is the trace signal value, OUT(t) is the previously determined average trace signal value, e is a base of a natural logarithm, τ is the predetermined time constant, and Δt is an amount of time that elapsed since the one or more processors determined the previously determined average trace signal value.

12. The method of claim 8, further comprising storing, by the auto-tune controller in the memory operably associated with the auto-tune controller, the current average trace signal value as the previously determined average trace signal value.

13. The method of claim 8, wherein adjusting the at least one component of the gas turbine engine includes adjusting at least one fuel-flow split of the gas turbine engine.

14. The method of claim 8, wherein adjusting the at least one component of the gas turbine engine includes adjusting at least one of an exhaust temperature bias of the gas turbine engine, a purge level of the gas turbine engine, an inlet guide vane opening of the gas turbine engine, and an inlet bleed heat position of the gas turbine engine.

15. A system comprising:
a gas turbine engine including one or more combustors, wherein fuel-flow splits govern a flow of fuel through fuel circuits for the one or more combustors;
one or more sensors operably coupled to the gas turbine engine and monitoring at least one of combustor dynamics and emission composition of the gas turbine engine; and
an auto-tune controller for controlling an auto-tuning process comprising:
receiving a trace signal value from the one or more sensors, wherein the trace signal value is indicative of at least one operating condition of the gas turbine engine;
retrieving, from memory operably associated with the auto-tune controller, one or more known system parameters, the one or more system parameters including a predetermined time constant associated with the gas turbine engine;

retrieving, from the memory operably associated with the auto-tune controller, a previously determined average trace signal value, the previously determined average trace signal value being a trace signal value processed by the auto-tune controller at a point in time prior to retrieving the previously determined average trace signal value;

determining a current average trace signal value using the trace signal value, the predetermined time constant, and the previously determined average trace signal value;

detecting that the current average trace signal value exceeds predetermined upper or lower limits; and adjusting at least one fuel-flow split of the gas turbine engine in response to detecting that the current average trace signal value exceeds the predetermined upper or lower limits.

16. The system of claim 15, wherein the one or more sensors monitors the combustor dynamics of the gas turbine engine, and wherein the trace signal value is a pressure reading of a combustor of the gas turbine engine.

17. The system of claim 15, wherein the one or more sensors monitors the emission composition of the gas turbine engine, and wherein the trace signal is a concentration of at least one of nitrous oxide and carbon monoxide present in emissions from the gas turbine engine.

18. The system of claim 15, wherein determining the current average trace signal value using the trace signal value, the predetermined time constant, and the determined average trace signal value includes determining the current average trace signal value using the following formula:

$$\mathrm{OUT}(t + \Delta T) = T - (T - \mathrm{OUT}(t))e^{-\frac{\Delta t}{\tau}}$$

wherein OUT(t+Δt) is the current average trace signal value, T is the trace signal value, OUT(t) is the previously determined average trace signal value, e is a base of a natural logarithm, τ is the predetermined time constant, and Δt is an amount of time that elapsed since the one or more processors determined the previously determined average trace signal value.

19. The system of claim 15, wherein the auto-tuning process further comprises storing, in the memory operably associated with the auto-tune controller, the current average trace signal value as the previously determined average trace signal value.

20. The system of claim 15, wherein the auto-tuning process further comprises adjusting at least one of an exhaust temperature bias of the gas turbine engine, a purge level of the gas turbine engine, an inlet guide vane opening of the gas turbine engine, and an inlet bleed heat position of the gas turbine engine.

* * * * *